US011411787B2

(12) United States Patent
Hossain et al.

(10) Patent No.: US 11,411,787 B2
(45) Date of Patent: Aug. 9, 2022

(54) PHASE MODULATED DATA LINK FOR LOW-SWING WIRELINE APPLICATIONS

(71) Applicant: Rambus Inc., San Jose, CA (US)

(72) Inventors: Masum Hossain, Edmonton (CA); Richelle L. Smith, Los Altos, CA (US); Carl W. Werner, Los Gatos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/363,557

(22) Filed: Jun. 30, 2021

(65) Prior Publication Data

US 2022/0014404 A1    Jan. 13, 2022

Related U.S. Application Data

(63) Continuation of application No. 16/864,079, filed on Apr. 30, 2020, now Pat. No. 11,088,888.

(60) Provisional application No. 62/848,550, filed on May 15, 2019.

(51) Int. Cl.
*H04L 27/227* (2006.01)
*H04L 27/233* (2006.01)
*H04L 27/34* (2006.01)
*H04L 27/20* (2006.01)

(52) U.S. Cl.
CPC ...... *H04L 27/2338* (2013.01); *H04L 27/2057* (2013.01); *H04L 27/2337* (2013.01); *H04L 27/3411* (2013.01)

(58) Field of Classification Search
CPC . H04L 27/2331; H04L 27/22; H04L 27/2338; H04L 27/0008; H04L 7/033; H04L 27/2075; H04L 7/0054; H04L 27/201; H04L 27/2046; H04L 27/205; H04L 27/2071; H04L 27/2057; H04L 27/2337; H04L 27/3411; H04L 27/2078; H04L 27/227; H04L 27/1563; H04L 27/18; H04L 27/2032
See application file for complete search history.

(56) References Cited

U.S. PATENT DOCUMENTS

| | | | |
|---|---|---|---|
| 5,438,592 | A | 8/1995 | Boccuzzi |
| 6,212,230 | B1 | 4/2001 | Rybicki et al. |
| 6,463,092 | B1 | 10/2002 | Kim et al. |
| 7,158,593 | B2 | 1/2007 | Kim et al. |
| 7,627,044 | B2 | 12/2009 | Kim et al. |
| 2001/0026593 | A1* | 10/2001 | Matsunaga ......... H04L 27/2332 375/262 |

* cited by examiner

*Primary Examiner* — Rahel Guarino
(74) *Attorney, Agent, or Firm* — Fenwick & West LLP

(57) ABSTRACT

A communication system comprises a transmitter and a receiver that communicate differential phase modulated data over a wireline channel pair. The transmitter encodes data symbols by generating first and second data signals with differentially phase shifted signal transitions with respect to one another. The receiver receives the first data signal and the second data signal and samples the first data signal based on a signal transition timing of the second data signal to generate a first output data symbol. The receiver furthermore samples the second data signal based on signal transition timing of the first data signal to generate a second output data symbol.

20 Claims, 5 Drawing Sheets

PHASE MODULATED DATA LINK FOR LOW-SWING WIRELINE APPLICATIONS

CROSS-REFERENCE TO RELATED APPLICATIONS

This application is a continuation of U.S. patent application Ser. No. 16/864,079 filed on Apr. 30, 2020, which claims the benefit of U.S. Provisional Application No. 62/848,550 filed on May 15, 2019, each of which is hereby incorporated by reference in its entirety.

BACKGROUND

Power in digital logic circuits is strongly related to $f \cdot C \cdot V^2$ where f is the frequency of the signal, C is the capacitance of the circuit, and V is the voltage of the signal. Therefore, reducing the voltage swing of the signal can significantly reduce power consumption. However, low voltage signals using traditional voltage-level signaling are subject to errors caused by voltage noise.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

A communication system comprises a transmitter and a receiver that communicate differential phase modulated data over a wireline link. The transmitter encodes data symbols by generating first and second data signals with signal transitions that are differentially phase shifted with respect to one another. For example, to encode a first symbol type, the transmitter outputs a phase-shifted signal transition of a source signal (e.g., a clock signal) as the first data signal and outputs an unshifted signal transition of the source signal as the second data signal. To encode a second symbol type, the transmitter instead outputs a phase-shifted signal transition of a source signal (e.g., a clock signal) as the second data signal and outputs an unshifted signal transition of the source signal as the first data signal. The receiver receives the first data signal and the second data signal and samples the first data signal based on a signal transition timing of the second data signal to generate a first output data symbol. Therefore, when the signal transition of the first data signal leads the signal transition of the second data signal (i.e., encoding a first symbol type), the first data signal will be sampled after its signal transition, thereby producing a sample corresponding to first output symbol type. Alternatively, when the signal transition of the first data signal lags the signal transition of the second data signal (i.e., encoding a second symbol type), the first data signal will be sampled before its signal transition, thereby producing a sample having a second output symbol type. The receiver furthermore samples the second data signal based on signal transition timing of the first data signal to generate a second output data symbol that is complementary to the first output data symbol.

Figure 1:
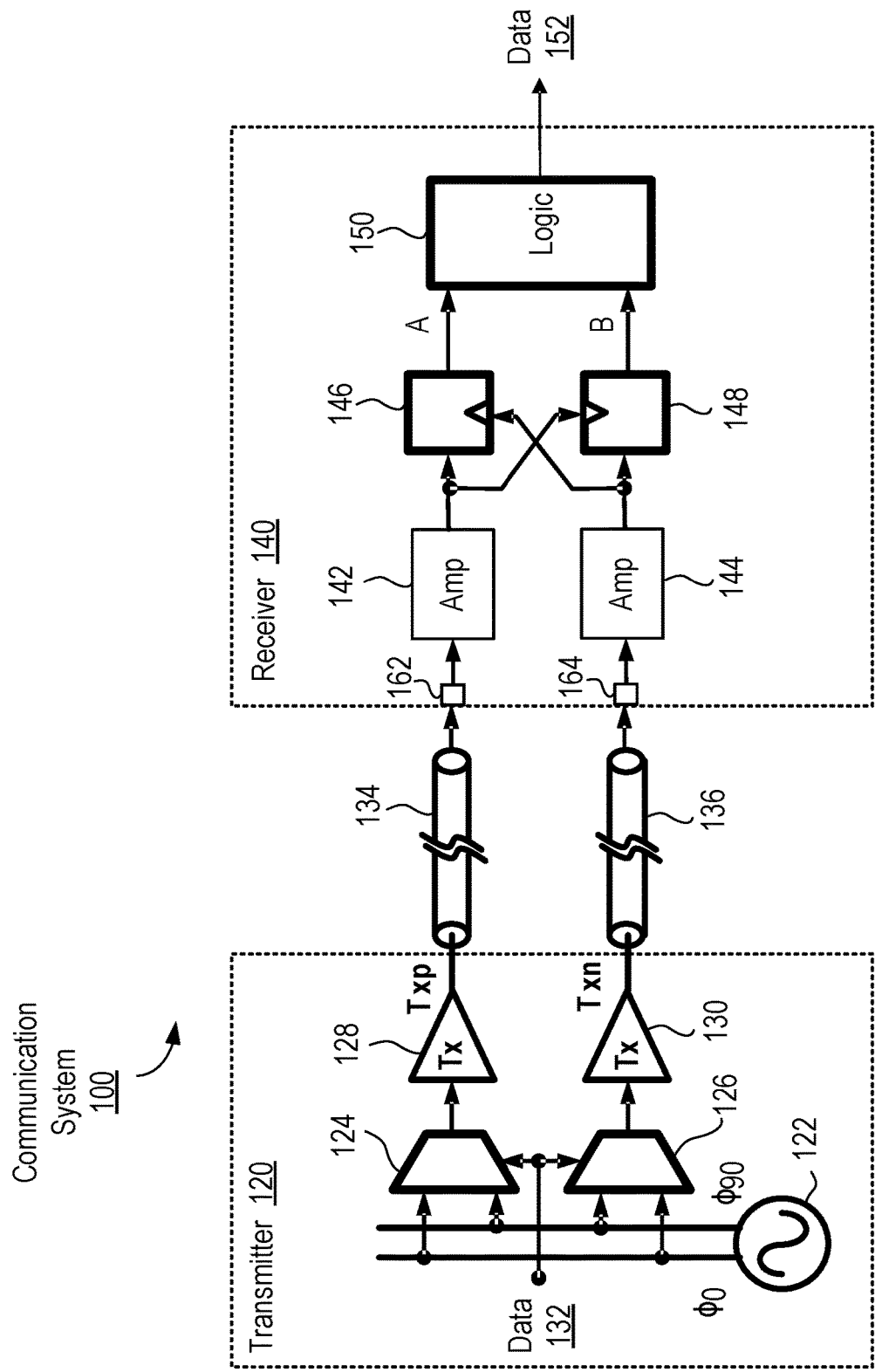
FIG. 1 is a circuit diagram illustrating a first example embodiment of a communication system using a phase-modulated data link.

FIG. 1 is a circuit diagram of a communication system 100 that communicates data using a phase-modulated data link. The communication system 100 comprises a transmitter 120 and a receiver 140 that communicate over a wireline channel pair including a first wire 134 and a second wire 136. The transmitter 120 receives input data signal 132 and encodes the input data signal 132 as differential phase-modulated signals including a first data signal (e.g., Txp) on the first wire 134 and a second data signal (Txn) on the second wire 136 that are differential in phase. The receiver 140 receives the differential phase-modulated signals Txp, Txn and decodes the differential phase-modulated signals Txp, Txn to generate an output data signal 152. Presuming no symbol errors occur during transmission, the output data signal 152 will recover the symbols of the input data signal 132.

The input data signal 132 and the output data signal 152 may be encoded using voltage levels to represent different symbol types (e.g., using CMOS or TTL signaling). In contrast, the differential phase-modulated signals Txp, Txn transmitted over the wires 134, 136 instead encode the different symbol types as phase differences between signal transitions (e.g., pulses) of the Txp signal on the first wire 136 and Txn on the second wire 134. For example, in binary phase modulation, the transmitter 120 causes a signal transition of the Txp signal to lead a signal transition of the Txn signal (e.g., a positive phase differential) during a symbol period to encode a first symbol type (e.g., a first logic value), and causes a signal transition of the Txn signal to lead a signal transition of the Txp signal (i.e., a negative phase differential) during a symbol period to encode a second symbol type (e.g., a second logic value). In one embodiment, a first symbol type is encoded by Txp leading Txn by 90 degrees and a second symbol type is encoded by Txp lagging Txn by 90 degrees. In alternative embodiments, the transmitter 120 may apply different phase differentials (e.g., −30°, −45°, −60°, −90°, +30°, +45°, +60°, +90°, etc.) to distinguish between different symbol types. Furthermore, in some embodiments, the transmitter 120 may encode multiple binary symbols in a single symbol period by selecting between 4, 8, or a different number of possible phase differentials each representing multiple bits of data of the input data signal 132.

The differential phase-modulated signals Txp, Txn may comprise low voltage swing signals that operate at substantially lower voltage swing than the voltage swing levels encoding the input data 132. Furthermore, the wires 134, 136 may be terminated or unterminated links. In an embodiment, DC blocking capacitors may be integrated in series with the wires 134, 136.

The transmitter 120 comprises a clock generator 122, a pair of multiplexers 124, 126, and a pair of amplifiers 128, 130. In an embodiment, the transmitter 120 is embodied on an integrated circuit (IC) chip and is used to transmit signals to another IC chip. The clock generator 122 generates a first clock signal and a second clock signal that are differential in phase. For example, the first clock signal may comprise an in-phase clock signal $\Phi_0$ and the second clock signal may comprise a quadrature-phase clock signal $\Phi_{90}$ that is phase-shifted 90° relative to the in-phase clock signal $\Phi_0$. The first clock signal and the second clock signal are each provided as inputs to the multiplexers 124, 126. The multiplexers 124, 126 each select between the first clock signal and the second clock signal based on the symbol type of the input data signal 132. Here, a first multiplexer 124 selects the in-phase clock signal $\Phi_0$ in response to the data signal 132 having a first symbol type and selects the quadrature phase clock signal $\Phi_{90}$ in response to the data signal 132 having a second symbol type. The second multiplexer 126 inversely selects the in-phase clock signal $\Phi_0$ in response to the data signal 132 having the second symbol type and selects the quadrature phase clock signal $\Phi_{90}$ in response to the data signal 132 having the first symbol type. Thus, the multiplexers 124, 126 respectively select opposite ones of the in-phase clock signal $\Phi_0$ and the quadrature phase clock signal $\Phi_{90}$ at each symbol period of the input data signal 132.

The amplifiers 128, 130 amplify the multiplexer output signals from the respective multiplexers 124, 126 to generate the differential phase-modulated signals Txp, Txn for transmission on the respective wires 134, 136. In an embodiment, the amplifiers 128, 130 may generate the phase differential phase-modulated signals Txp, Txn as low voltage swing signals. As a result, a first symbol type of the input data signal 132 for a given symbol time interval is encoded by a phase shifted signal transition in first data signal Txp and a second symbol type of the input data signal 132 is encoded by a phase shifted signal transition in the second data signal Txn.

The receiver 140 comprises a pair of input ports 162, 164, a pair of amplifiers 142, 144, a pair of samplers 146, 148, and a logic circuit 150. In an embodiment, the receiver 140 may be embodied as a circuit on an integrated circuit chip to receive a signal transmitted by another IC chip. The input ports 162, 164 receive the differential phase-modulated signals Txp, Txn from the wires 134, 136. The amplifiers 142, 144 generate respective amplified signals based on the differential phase-modulated signals Txp, Txn (e.g., a first amplified signal corresponding to Txp and a second amplified signal corresponding to Txn). The first sampler 146 samples the first amplified signal based on signal transition timing of the second amplified signal (e.g., on the rising edge the second amplified signal) to generate a first sampled output signal A. The second sampler 148 samples the second amplified signal based on signal transition timing of the first amplified signal (e.g., on the rising edge of the first amplified signal) to generate a second sampled output signal B. Thus, if a signal transition of the first amplified signal leads a signal transition of the second amplified signal (i.e., encoding a first symbol type), the first sampler 146 will sample a voltage of the first amplified data signal corresponding to the first symbol type while the second sampler 146 will sample a voltage of the second amplified data signal corresponding to the second symbol type. On the other hand, if a signal transition of the first amplified data signal lags the signal transition of the second amplified data signal (i.e., encoding a second symbol type), the first sampler 146 will sample a voltage of the first amplified data signal corresponding to the second symbol type while the second sampler 148 will sample a voltage of the second amplified data signal corresponding to the first symbol type. As a result, the first sampled output signal A and the second sampled output signal B are differential in voltage such that when sampled output signal B has a logic high voltage level, sampled output signal A has a logic low voltage level, and vice versa. The logic circuit 150 detects the voltage difference between the first sampler output from the first sampler 148 and the second sampler output from the second sampler 146 and generates the output data signal 152. For example, the output data signal 152 may have a first logic level corresponding to the first symbol type when A−B is positive and may have a second logic level corresponding to the second symbol type when A−B is negative. Thus, the receiver 140 demodulates the differential phase-modulated signals Txp, Txn to generate a differential voltage output. In an embodiment, the logic circuit 150 may furthermore include digital logic to detect fault conditions (e.g., when A=B).

In an embodiment, an integrated circuit chip may comprise a transceiver that includes both a transmitter 120 and a receiver 140. In this embodiment, the transceiver may communicate with another transceiver chip using a bidirectional link in which each transmitter/receiver pair communicate over a shared pair of wires. Alternatively, the transceiver may communicate with another transceiver chip using unidirectional links in which each transmitter/receiver pair communicate over separate dedicated wireline differential channels.

Figure 2:
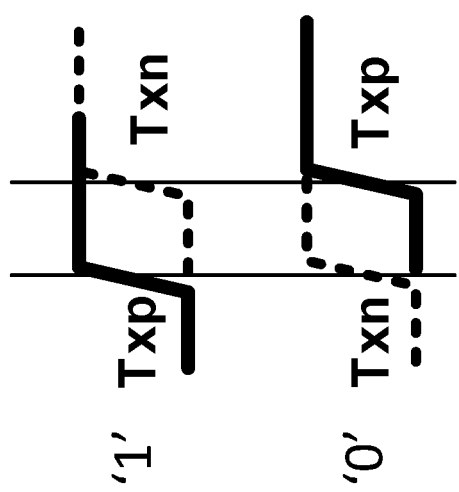
FIG. 2 is a waveform diagram illustrating an example embodiment of a signaling scheme for a phase-modulated data link.

FIG. 2 illustrates example waveforms for encoding a binary input symbol as differential phase-modulated signals Txp, Txn. To encode a first symbol type (e.g., '1'), the transmitter 120 generates differential phase-modulated signals Txp, Txn in which a signal transition of the first data signal Txp is phase shifted relative to a signal transition of the second signal Txn during a given symbol period (e.g., Txp leads Txn). To encode a second symbol type (e.g., '0'), the transmitter 120 generates a differential phase-modulated signals Txp, Txn in which a signal transition of the second data signal Txn is phase shifted relative to the signal transition of the first data signal Txp during the given symbol period (e.g., Txn leads Txp).

Figure 3:
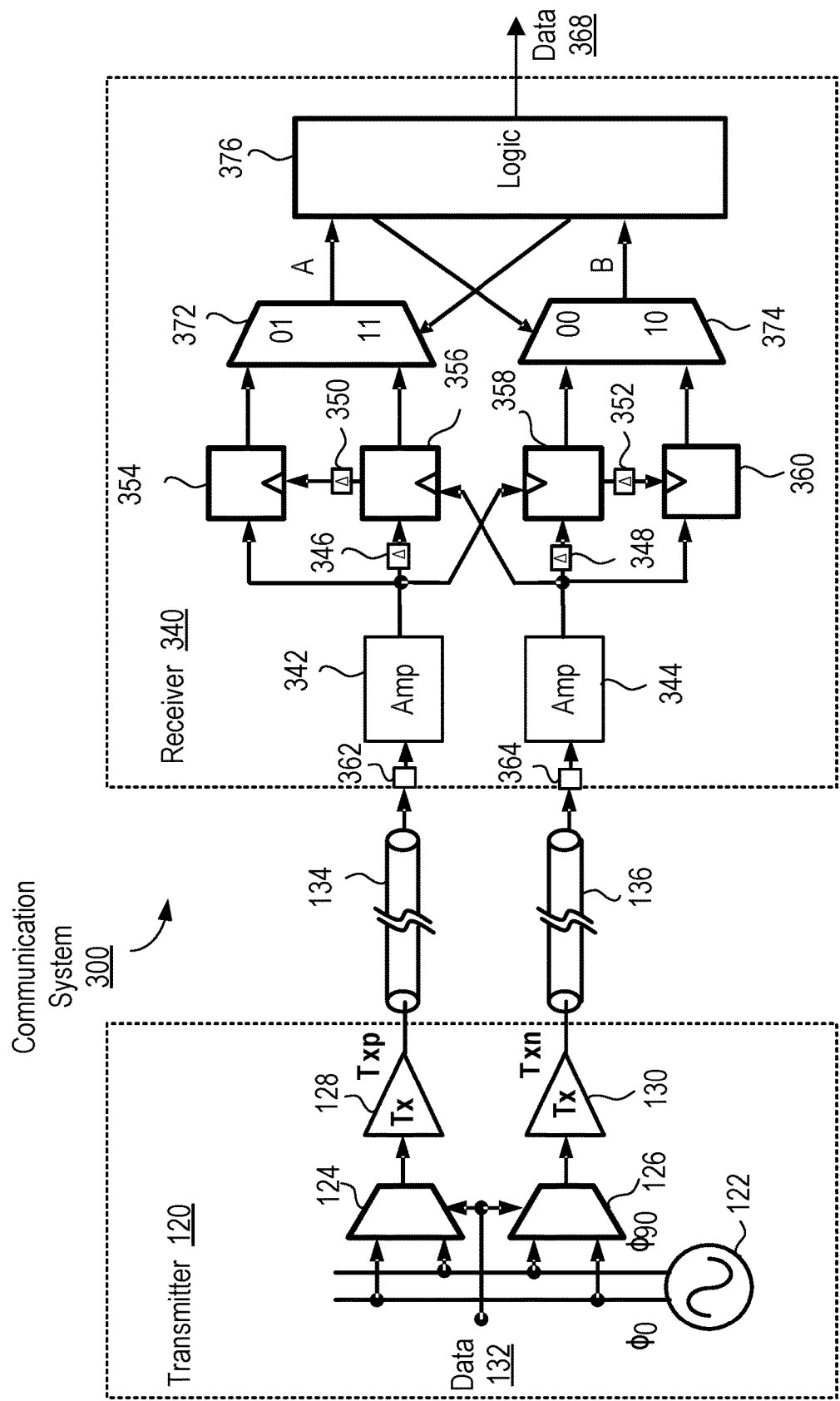
FIG. 3 is a circuit diagram illustrating a second example embodiment of a communication system using a phase-modulated data link.

FIG. 3 illustrates an embodiment of a communication system 300 that communicates data using a phase-modulated data link. The communication system 300 includes a transmitter 120 and wires 134, 136 as described above, and includes a receiver 340 that performs decision feedback equalization. The decision feedback equalization compensates for frequency dependent attenuation caused by the wires 134, 136 that may distort the received differential phase-modulated signals Txp, Txn. Particularly, the receiver 340 applies different sample timing to the received differential phase-modulated signals Txp, Txn selected according to a prior decoded symbol. Thus, for example, the receiver 340 generates output symbols based on a first sample timing when the prior decoded symbol is a first symbol type, and generates output symbols based on a second sample timing when the prior decided symbol is a second symbol type.

The receiver 340 comprises a pair of input ports, 362, 364, a pair of amplifiers 342, 344, a plurality of samplers 354, 356, 358, 360, multiplexers 372, 374, digital logic 376, and a plurality of delay elements 346, 348, 350, 352. The input ports 362, 364 receive the differential phase-modulated signals Txp, Txn from the wires 134, 136. The amplifiers 342, 344 generate respective amplified signals based on the differential phase-modulated signals Txp, Txn (e.g., a first amplified signal corresponding to Txp and a second amplified signal corresponding to Txn). The first and second samplers 354, 356 each sample the first amplified signal (based on Txp) from the first amplifier 342 based on the second amplified signal from the second amplifier 344 (based on Txn), but each perform the sampling according to different timings. Particularly, the first sampler 354 samples the first amplified signal based on timing of a signal transition in a delayed second amplified signal (delayed by delay element 350) while the second sampler 356 samples a delayed first amplified signal (delayed by delay element 346) based on timing of a signal transition in the second amplified signal. Thus, sampling of the first amplified signal using the first sampler 354 occurs relatively later in the symbol period (due to the sampling time being delayed), while sampling of the first amplified signal using the second sampler 356 occurs relatively earlier in the symbol period (due to the first amplified signal being delayed). The first multiplexer 372 selects between the first sampled output from the first sampler 354 and the second sampled output from the second sampler 356 based on a prior decided symbol. For example, if the prior decided symbol had a first symbol type (e.g., '0'), the first multiplexer 372 selects the output of the first sampler 354 (sampled later in the symbol period), while if the prior decided symbol had a second symbol type (e.g., '1'), the first multiplexer 372 selects the output of the second sampler 356 (sampled earlier in the symbol period).

The third and fourth samplers 358, 360 each sample the second amplified signal based on the first amplified signal, but perform the sampling according to different timings. Here, the third sampler 358 samples the second amplified signal based on timing of a signal transition in a delayed first amplified signal (e.g., delayed by delay element 352) while the fourth sampler 360 samples a delayed second amplified signal (e.g., delayed by delay element 348) based on timing of a signal transition in the first amplified signal. Thus, sampling of the second amplified signal using the third sampler 358 occurs relatively later in the symbol period (due to the sampling time being delayed), while sampling of the second amplified signal using the fourth sampler 360 occurs relatively earlier in the symbol period (due to the second amplified signal being delayed). The second multiplexer 374 selects between the third sampled output from the third sampler 358 and the fourth sampled output from the fourth sampler 360 based on a prior symbol decision. For example, if the prior decided symbol has a first symbol type (e.g., '0'), the second multiplexer 374 selects the output of the third sampler 358 (sampled later in the symbol period), while if the prior decision has a second symbol type (e.g., '1'), the second multiplexer 374 selects the output of the fourth sampler 360 (sampled earlier in the symbol period).

In an embodiment, although delay elements 348 and 350 are shown separately, these may comprise a single delay element that outputs to both sampler 354 and sampler 358 in an embodiment. Similarly, although delay elements 346 and 352 are shown separately, in an embodiment, these may comprise a single delay element that outputs to both sampler 356 and 360.

In an alternative embodiment, delay elements 346 and 348 may be omitted. In this case, the second sampler 356 receives the first amplified signal directly (i.e., un-delayed) and the third sampler 358 receives the second amplified signal directly (i.e., un-delayed).

The logic circuit 366 receives the respective symbol decisions from the multiplexers 372, 374 and generates the output data signal 368 based on a voltage difference between the first decided signal A from the first multiplexer 372 and the second decided signal B from the second multiplexer 374. For example, in an embodiment, the output data signal 368 may be based on a voltage difference between the first decided signal A and the second decided signal B (i.e., A-B). Furthermore, in an embodiment, the logic circuit 366 may direct and output error conditions (e.g., A=B).

Figure 4A:
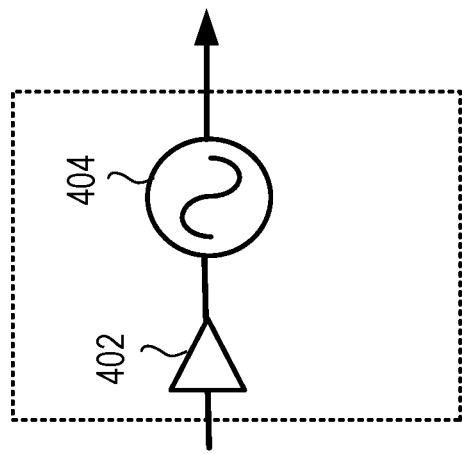
FIG. 4A is a circuit diagram illustrating a first example embodiment of an amplifier for a receiver of a communication system using a phase-modulated data link.
Figure 4B:
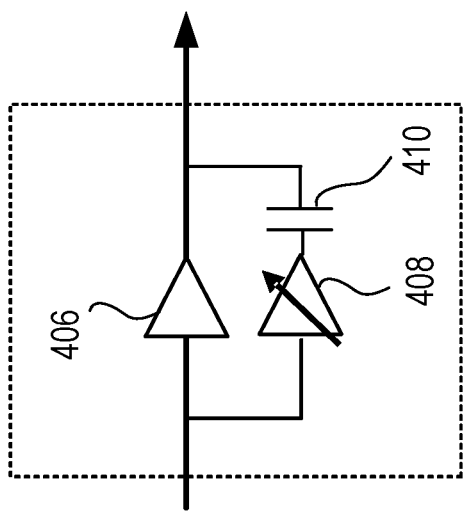
FIG. 4B is a circuit diagram illustrating a second example embodiment of an amplifier for a receiver of a communication system using a phase-modulated data link.
Figure 4C:
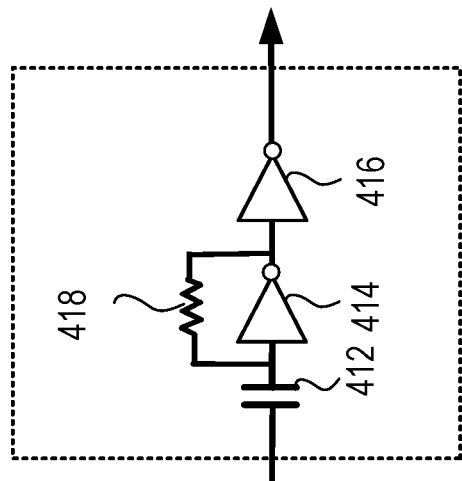
FIG. 4C is a circuit diagram illustrating a third example embodiment of an amplifier for a receiver of a communication system using a phase-modulated data link.

FIGS. 4A-4C illustrate examples of amplifier circuits that can be used as amplifiers 142, 144, 342, 344 in the embodiments above. FIG. 4A illustrates a first example embodiment of an amplifier comprising a buffer 402 and an injection-locked oscillator (ILO) 404. The buffer 402 buffers an input signal to generate a buffered input signal provided to the ILO 404. The ILO 404 generates a rail-to-rail signal based on the buffered input signal with very low phase noise, thereby preserving the phase-modulated encoding. In operation a full voltage swing signal produced by the ILO 404 is shifted in phase based on the received signal which may be of lower amplitude than the full voltage swing of the ILO 404.

FIG. 4B illustrates a second example embodiment of an amplifier comprising a linear including a buffer 406 in parallel with a variable amplifier 408 and capacitor 410. This amplifier performs linear equalization on the input signal.

FIG. 4C illustrates a third example embodiment of an amplifier comprising an amplifier having a capacitor 412, a resistor 418, a first inverter 414, and a second inverter 416. The capacitor 412 and the resistor 418 are configured as a low pass filter to pass high frequency signal through the first inverter 414. In this embodiment, the amplifier may be linear or non-linear.

Figure 5:
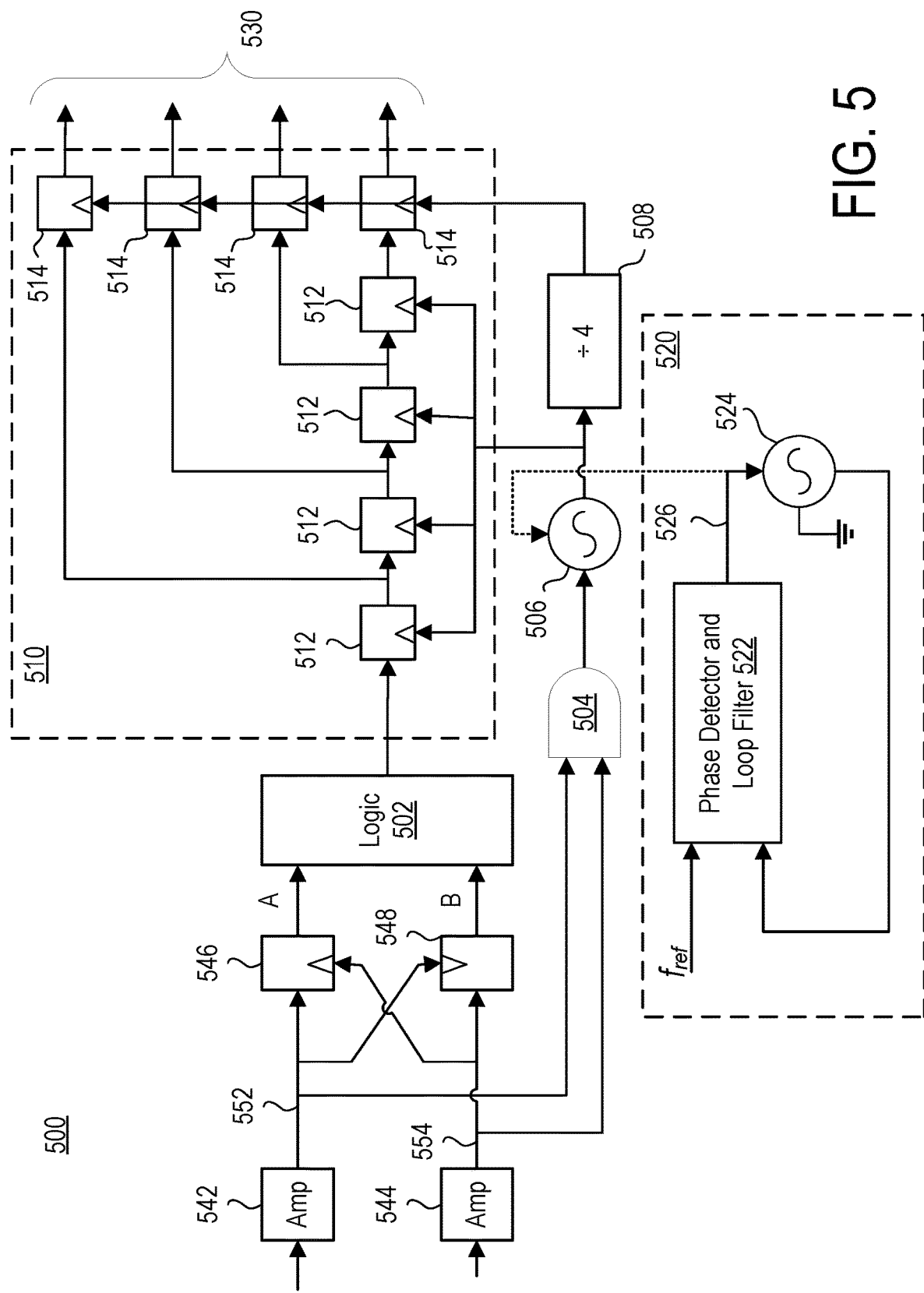
FIG. 5 is a circuit diagram illustrating an example embodiment of a logic circuit for a receiver of a communication system using a phase-modulated data link.

FIG. 5 illustrates another example of a receiver 500. The receiver 500 receives the differential phase-modulated signals Txp, Txn and generates de-serialized 4-bit data words on a 4-bit output data channel 530. The receiver 500 includes amplifiers 542, 544, samplers 546, 548, a logic circuit 502, an AND gate 504, an ILO 506, a divider circuit 508, and a de-serializer circuit 510. The logic circuit 500 furthermore optionally includes a reference loop 520 including a phase detector and loop filter 522 and an ILO 524.

The amplifiers 542, 544, samplers 546, 548, and logic 502 operate similarly to the amplifiers 142, 144, samplers 146, 148, and logic 102 described above in FIG. 1. Particularly, the amplifiers generate amplified signals 552, 554. The amplified signal 552 is sampled by the sampler 146 based on timing of the amplified signal 554, and the amplified signal 554 is sampled by the sampler 148 based on the timing of the amplified signal 552 to generate sampled signals A, B. The logic 502 outputs a recovered data stream based on a difference between the sampled signals A, B.

The AND gate 504, ILO 506, and optional reference loop 520 collectively operate to recover a clock signal from the amplified signals 552, 554. Clock recovery is performed by detecting the data period in the amplified signals 552, 554 generating an oscillating signal having a frequency based on the data period. Specifically, the AND gate generates a signal transition on the later of the signal transitions of the amplified signals 552, 554 (e.g., when both logic signals are logic high). Thus, the signal transition is generated once per symbol period. The ILO 506 generates a clock signal that locks to the frequency of the signal transitions generated by the AND gate 504. The clock divider 508 divides the clock signal to generate a divided clock signal (e.g., at ¼ the frequency of clock signal).

The de-serializer circuit 510 includes a set of serial flip flops 512 (e.g., four serial flip flops) that operate as a shift register to shift in a symbol from the data recovery logic 502 on each clock cycle. Thus, at any given time, the set of symbols in these flip flops 512 represent the most recent set of recovered data symbols. These last four data symbols are outputted to a set of parallel flip flops 514 (e.g., four parallel flip flops) that output in parallel to the output data channel 530 based on the divided clock signal.

The optional reference loop 520 generates an ILO control signal 526 to control a base frequency of the ILO 506. While the ILO 506 can operate free running without any control signal 526, the use of a control signal 526 that sets the ILO 506 close to the expected frequency of the incoming data signal enables the ILO 506 to lock onto to frequency of the data signals and recover the clock signal more quickly. In an embodiment, the reference loop 520 comprises a phase detector and loop filter 522 and an ILO 524. The ILO 524 has an injection input that is grounded and outputs an oscillating signal based on the control signal 526. The oscillating signal from the ILO 524 is provided as a feedback signal to the phase detector and loop filter 522. The phase detector and loop filter 522 compares the feedback signal to a reference frequency $f_{ref}$ and adjusts the control signal 526 in a feedback loop to match the output frequency of the ILO 524 to the reference frequency $f_{ref}$. By using a reference frequency $f_{ref}$ similar to the frequency of the data signal, the ILO 506 can quickly lock to the clock frequency for clock recovery.

In an embodiment, where the amplifiers 542, 544 are implemented using ILOs 404 (e.g., as in FIG. 4A), the control signal 526 can also provide a control signal 526 to these ILOs 404 to enable the ILOs 404 to more quickly lock to the frequencies of the respective data signals Txp, Txn.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A chip comprising:
a set of input nodes to receive respective first and second data signals that represent differential phase modulated data such that, for a symbol time interval, a phase shifted signal transition in the first data signal is used to encode a first binary symbol type and a phase shifted signal transition in the second data signal is used to encode a second binary symbol type; and
a logic circuit configured to output an output signal based on a difference between the first data signal and the second data signal,
wherein the output signal corresponds to the first binary symbol type responsive to the difference being a positive value and the output signal corresponds to the second binary symbol type responsive to the difference being a negative value.

2. The chip of claim 1, wherein the phase shifted signal transition in the first data signal has a phase difference relative to a signal transition in the second data signal to encode the first binary symbol type, and wherein the phase shifted signal transition in the second data signal has the phase difference relative to a signal transition in the first data signal to encode the second binary symbol type.

3. The chip of claim 1, further comprising:
a first amplifier circuit comprising a first injection-locked oscillator, the first amplifier circuit to amplify first data signal prior to a sampler circuit sampling the first data signal; and
a second amplifier circuit comprising a second injection-locked oscillator, the second amplifier circuit to amplify the second data signal prior to the sampler circuit sampling the second data signal.

4. The chip of claim 1, further comprising:
a first linear gain amplifier circuit, the first linear gain amplifier circuit to amplify first data signal prior to a sampler circuit sampling the first data signal; and
a second linear gain amplifier circuit, the second linear gain amplifier circuit to amplify the second data signal prior to the sampler circuit sampling the second data signal.

5. The chip of claim 1, wherein the logic circuit is further configured to generate a carrier clock having a carrier clock frequency that matches a signal symbol rate of the first and second data signals, and to deserialize the first and second output data signals based on the carrier clock frequency.

6. The chip of claim 5, wherein the logic circuit comprises:
a reference loop circuit to generate a control signal for a first oscillator based on a difference between a reference frequency signal and an oscillating signal outputted from the first oscillator; and
a second oscillator to generate the carrier clock based on the control signal and to adjust the carrier clock based on transition frequency of the first and second data signals.

7. The chip of claim 1, wherein the set of input nodes are coupled to receive the first data signal and the second data signal through a capacitor.

8. The chip of claim 1, wherein the logic circuit is further configured to recover a non-return-to-zero data stream based on samples of the first data signal and the second data signal.

9. The chip of claim 1, further comprising:
a transmitter to encode an input data signal using differential phase delay modulation for transmission to another chip.

10. The chip of claim 9, wherein the transmitter comprises:
a clock generator circuit to generate an in-phase clock signal and a phase-delayed clock signal having a fixed phase delay relative to the in-phase clock signal;
a first multiplexer to select the in-phase clock signal responsive to an input data symbol of the input data signal being the first binary symbol type and to select the phase-delayed clock signal responsive to the input data symbol of the input data signal being the second binary symbol type to generate a first transmit signal;
a second multiplexer to select the in-phase clock signal responsive to the input data symbol of the input data signal being the second binary symbol type and to select the phase-delayed clock signal responsive to the input data symbol of the input data signal being the first binary symbol type to generate a second transmit signal;
a first transmit buffer to transmit the first transmit signal; and
a second transmit buffer to transmit the second transmit signal.

11. The chip of claim 1, further comprising:
a sampler circuit to sample the differential phase modulated data, the sampler circuit to sample the first data signal responsive to a signal transition timing derived from the second data signal to generate a first output data sample, and sample the second data signal in response to a signal transition timing derived from the first data signal to generate a second output data sample.

12. The chip of claim 11, wherein the sampler circuit comprises:
a decision feedback equalization circuit to equalize the first output data sample and the second output data sample based on one or more prior received data symbols, the decision feedback equalization circuit comprising:
  a first delay element to delay the first data signal to generate a delayed first data signal;
  a second delay element to delay the second data signal to generate a delayed second data signal;
  a first sampler to sample the first data signal in response to a signal transition in the delayed second data signal to generate a first candidate data sample;
  a second sampling circuit to sample the delayed first data signal based on a signal transition in the second data signal to generate a second candidate data sample;
  a first multiplexer to select between the first output data sample and the second output data based on a prior decided symbol to generate the first output data sample;
  a third sampler to sample the second data signal in response to a signal transition in the delayed first data signal to generate a third candidate data sample;
  a fourth sampler to sample the delayed second data signal in response to a signal transition in the first data signal to generate a fourth candidate data sample; and
  a second multiplexer to select between the third candidate data sample and the fourth candidate data sample based on the prior decided symbol to generate the second output data sample.

13. A method comprising:
receiving, by a set of input nodes, respective first and second data signals that represent differential phase modulated data such that, for a symbol time interval, a phase shifted signal transition in the first data signal is used to encode a first binary symbol type and a phase shifted signal transition in the second data signal is used to encode a second binary symbol type; and
outputting, by a logic circuit, an output signal based on a difference between the first data signal and the second data signal,
wherein the output signal corresponds to the first binary symbol type responsive to the difference being a positive value and the output signal corresponds to the second binary symbol type responsive to the difference being a negative value.

14. The method of claim 13, wherein the phase shifted signal transition in the first data signal has a phase difference relative to a signal transition in the second data signal to encode the first binary symbol type, and wherein the phase shifted signal transition in the second data signal has the phase difference relative to a signal transition in the first data signal to encode the second binary symbol type.

15. The method of claim 13, further comprising:
amplifying, by a first amplifier circuit, the first data signal prior to a sampler circuit sampling the first data signal; and amplifying, by a second amplifier circuit, the second data signal prior to the sampler circuit sampling the second data signal.

16. The method of claim 13, further comprising:
generating, by the logic circuit, a carrier clock having a carrier clock frequency that matches a signal symbol rate of the first and second data signals; and
deserializing, by the logic circuit, the first and second output data signals based on the carrier clock frequency.

17. The method of claim 16, further comprising:
generating, by a reference loop, a control signal for a first oscillator based on a difference between a reference frequency signal and an oscillating signal outputted from the first oscillator; and
generating, by a second oscillator, the carrier clock based on the control signal;
adjusting, by the second oscillator, the carrier clock based on a transition frequency of the first and second data signals.

18. The method of claim 13, further comprising:
recovering, by the logic circuit, a non-return-to-zero data stream from a first output data sample sampled from the first data signal and a second output data sample sampled from the second data signal.

19. The method of claim 13 further comprising:
generating, by a clock generator circuit, an in-phase clock signal and a phase-delayed clock signal having a fixed phase delay relative to the in-phase clock signal;
selecting, by a first multiplexer, the in-phase clock signal responsive to an input data symbol of an input data signal being the first binary symbol type;
selecting, by the first multiplexer, the phase-delayed clock signal responsive to the input data symbol of the input data signal being the second binary symbol type to generate a first transmit signal;
selecting, by a second multiplexer, the in-phase clock signal responsive to the input data symbol of the input data signal being the second binary symbol type;
selecting, by the second multiplexer, the phase-delayed clock signal responsive to the input data symbol of the input data signal being the first binary symbol type to generate a second transmit signal;
transmitting, by a first transmit buffer the first transmit signal; and
transmitting, by a second transmit buffer, the second transmit signal.

20. A communication system comprising:
a transmitter circuit to phase modulate an input data symbol to generate a first data signal and a second data signal that are differential in phase, where the input data symbol is encoded based on a phase difference between the first and second data signals, and to transmit the first data signal and the second data signal over a wired link; and
a receiver circuit to receive the first data signal and the second data signal over the wired link and output an output signal based on a difference between the first data signal and the second data signal,
wherein the output signal corresponds to a first binary symbol type responsive to the difference being a positive value and the output signal corresponds to a second binary symbol type responsive to the difference being a negative value.

* * * * *